United States Patent
McCorkendale et al.

(10) Patent No.: US 8,170,549 B1
(45) Date of Patent: May 1, 2012

(54) USE OF PHYSICAL LOCATION AND APPLICATION STATE INFORMATION IN ROUTING PREFERENCES FOR ELECTRONIC COMMUNICATIONS

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 152 days.

(21) Appl. No.: 12/724,316

(22) Filed: Mar. 15, 2010

(51) Int. Cl.
*H04W 4/12* (2009.01)
(52) U.S. Cl. ............ 455/432.2; 342/367; 370/312
(58) Field of Classification Search ......... 455/445, 455/456.1; 342/367, 450; 370/312, 329
See application file for complete search history.

(56) References Cited

U.S. PATENT DOCUMENTS

2006/0256008 A1* 11/2006 Rosenberg ............ 342/367
2008/0233969 A1 9/2008 Mergen et al.
2009/0028318 A1 1/2009 Bhogal et al.

OTHER PUBLICATIONS

Alexander Falk, Google Voice Review, Mar. 12, 2009, XML Aficionado, retrieved from the Internet: URL:http:www.xmlaficionado.com/2009/03/google-voice-review.html.

* cited by examiner

*Primary Examiner* — Phuoc Doan
(74) *Attorney, Agent, or Firm* — Brill Law Office; Jeffrey Brill

(57) ABSTRACT

Electronic communication messages are routed according to a user's current physical location and the physical locations of communication devices. A plurality of communication devices such as telephones and computers are associated with the user. The physical locations of the plurality of communication devices are tracked. The current physical location of the user is also tracked in real-time. Incoming communication messages to the user and outgoing communication messages from the user are routed according to routing preferences based on at least the current physical location of the user and physical locations of at least one of the communication devices.

19 Claims, 4 Drawing Sheets

USE OF PHYSICAL LOCATION AND APPLICATION STATE INFORMATION IN ROUTING PREFERENCES FOR ELECTRONIC COMMUNICATIONS

TECHNICAL FIELD

This disclosure pertains generally to communication and messaging systems, and more specifically to using location and application state information in routing preferences used by such systems.

BACKGROUND

Services such as Google Voice allow a user to register multiple telephones with a single account. The account is associated with a single phone number, and thus the service enables a user to choose which registered phone(s) to use to make and receive calls from/to the single phone number. The user can make an outgoing call from any registered phone. To do so, the user operates a web-based application to select the registered phone from which to make the outgoing call. In some instances, the user can initiate an outgoing call by instead calling a phone number associated with the service, and specifying through a voice or keypad interface from which registered phone to make the outgoing call. The service then calls the user on that phone, and connects him/her to the phone number the user wishes to call. The number associated with the user's account is the phone number from which the call originates.

Concerning incoming calls made to the telephone number associated with the account, the service allows the user to specify a "ring order" for the multiple registered phones. The user operates the web-based application to input this ring order. The ring order specifies in what order the service is to ring the user's different registered phones when a call or text message is made to the user's phone number. For example, the ring order could specify to first try a work phone, and if the user does not answer to next try a home phone and finally a mobile phone. The user can also specify to ring all of the user's registered phones simultaneously when a call or text message is made to the user's phone number.

The functionality provided by Google Voice and other services of this nature can be very convenient, but the user must specify the ring order, whereas in practice the user often does not know where s/he will be when calls are received, and hence which specific phone the user will want to use to take the calls. Ringing all of the phones (at once or in an order not pertaining to the user's current location) can be disadvantageous. For example, this can result in ringing the user's home phone for all incoming SMS messages and phone calls when the user is not home but the user's roommate is, or ringing the user's work phone when the user is at lunch, at home sick, or even on vacation. The user could keep updating the ring preferences based on his/her whereabouts, but this would create a large burden of effort for the user. Furthermore, to place an outgoing call the user must specifically input the given phone to use, which is also a burden for the user.

Some telephone routing systems, for example those described by published United States Patent Applications 20080233969 and 20090028318, track a user's physical location under certain circumstances (using, for example, GPS technology) and route incoming telephone calls to a specific telephone that is physically proximate to the user. More specifically, published United States Patent Application 20080233969 describes tracking a user's whereabouts within an area served by a given Private Branch Exchange ("PBX") (e.g., an office building, a hospital, etc.). Incoming calls received for the user (in this case, calls made to a specific virtual extension) are routed to the telephone under the jurisdiction of the PBX that is physically closest to the user. If the user is outside the served area, incoming calls can be parked or sent to voice mail. Published United States Patent Application 20080233969 describes this technology as being useful for scenarios in which mobile phones cannot be used, such as hospitals.

Published United States Patent Application 20090028318 describes tracking a user's current location and routing incoming calls for the user to one of a plurality of telephones, based on the user's current location and user supplied or default routing criteria. More specifically, the system receives incoming calls for the user on a single proxy phone number. The user's current location is determined by using, e.g., GPS technology. Routing criteria are checked, specifying to which phone to route the call based on the user's current location (e.g., if the user is within 100 feet of his/her home phone, then route the call there, etc.). The criteria can also specify a default action (e.g., if the user is not proximate to any fixed location phone, then route the call to the user's mobile phone). The incoming call is then routed according to the user's location and the criteria.

Additionally, some Femtocell systems can route incoming calls to a user's landline to the user's cell phone, if the user is currently within range of the local Femtocell tower (e.g., in a specific covered office building).

The above-described routing systems are useful, but are limited in their capabilities. First of all, they only concern the routing of incoming calls, and provide no support for processing outgoing calls. Furthermore, these systems do not provide any functionality concerning non-voice communications, such as SMS messages.

It would be desirable to address the various above-described issues.

SUMMARY

A communication routing system routes communication messages according to a user's current physical location and the physical locations of communication devices. A plurality of communication devices such as telephones and computers are associated with the user. In some embodiments, the user registers this plurality of communication devices with the communication routing system. The communication routing system tracks physical locations of the plurality of communication devices. This can comprise receiving physical locations of communication devices from the user and/or using location tracking functionality (e.g., GPS) of communication devices to track their physical locations. The communication routing system also tracks the current physical location of the user in real-time, for example by associating a specific, mobile communication device with the user (e.g., the user's mobile phone), and using location tracking functionality of the mobile communication device to track the physical location of the user. Incoming communication messages to the user and outgoing communication messages from the user are routed according to routing preferences based on at least the current physical location of the user and physical locations of at least one of the communication devices. These routing preferences can be received from the user.

In one embodiment, routing incoming communication messages to the user comprises routing incoming telephone calls made to a single telephone number associated with the user to at least one telephone associated with the user, according to routing preferences for incoming telephone calls based on at least the current physical location of the user and physical locations of multiple telephones associated with the user. In another embodiment, routing incoming communication messages to the user comprises routing incoming electronic text-based messages sent to a message handle associated with the user to at least one communication device associated with the user in a specific format, according to routing preferences for incoming electronic text-based messages based on at least the current physical location of the user, physical locations of multiple communication devices, and a current usage state of a messaging application by the user.

In one embodiment, routing outgoing communication messages from the user comprises originating outgoing telephone calls from a single telephone number associated with the user from a specific telephone associated with the user, according to routing preferences for outgoing telephone calls based on at least the current physical location of the user and the physical location of at least one telephone associated with the user. In another embodiment, routing outgoing communication messages from the user comprises sending outgoing electronic text-based messages from a message handle associated with the user from a specific communication device associated with the user in a specific format, according to routing preferences for outgoing electronic text-based messages based on at least the current physical location of the user, the physical location of at least one communication device associated with the user, and a current usage state of a messaging application by the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
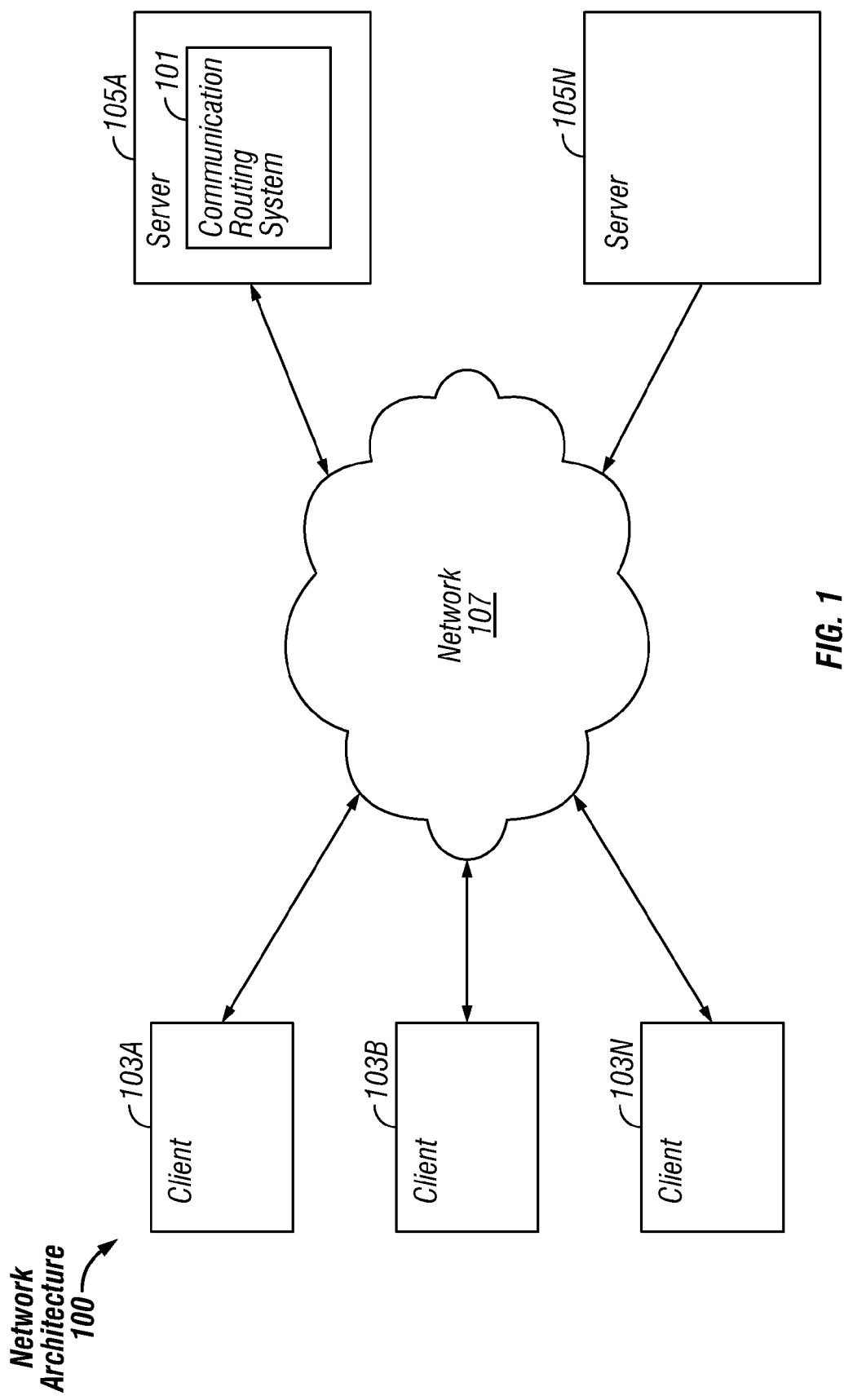
FIG. 1 is a block diagram of an exemplary network architecture in which a communication routing system can be implemented, according to some embodiments.

FIG. 1 is a block diagram illustrating an exemplary network architecture 100 in which a communication routing system 101 can be implemented. The illustrated network architecture 100 comprises multiple clients 103A, 103B and 103N, as well as multiple servers 105A and 105N. In FIG. 1, the communication routing system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
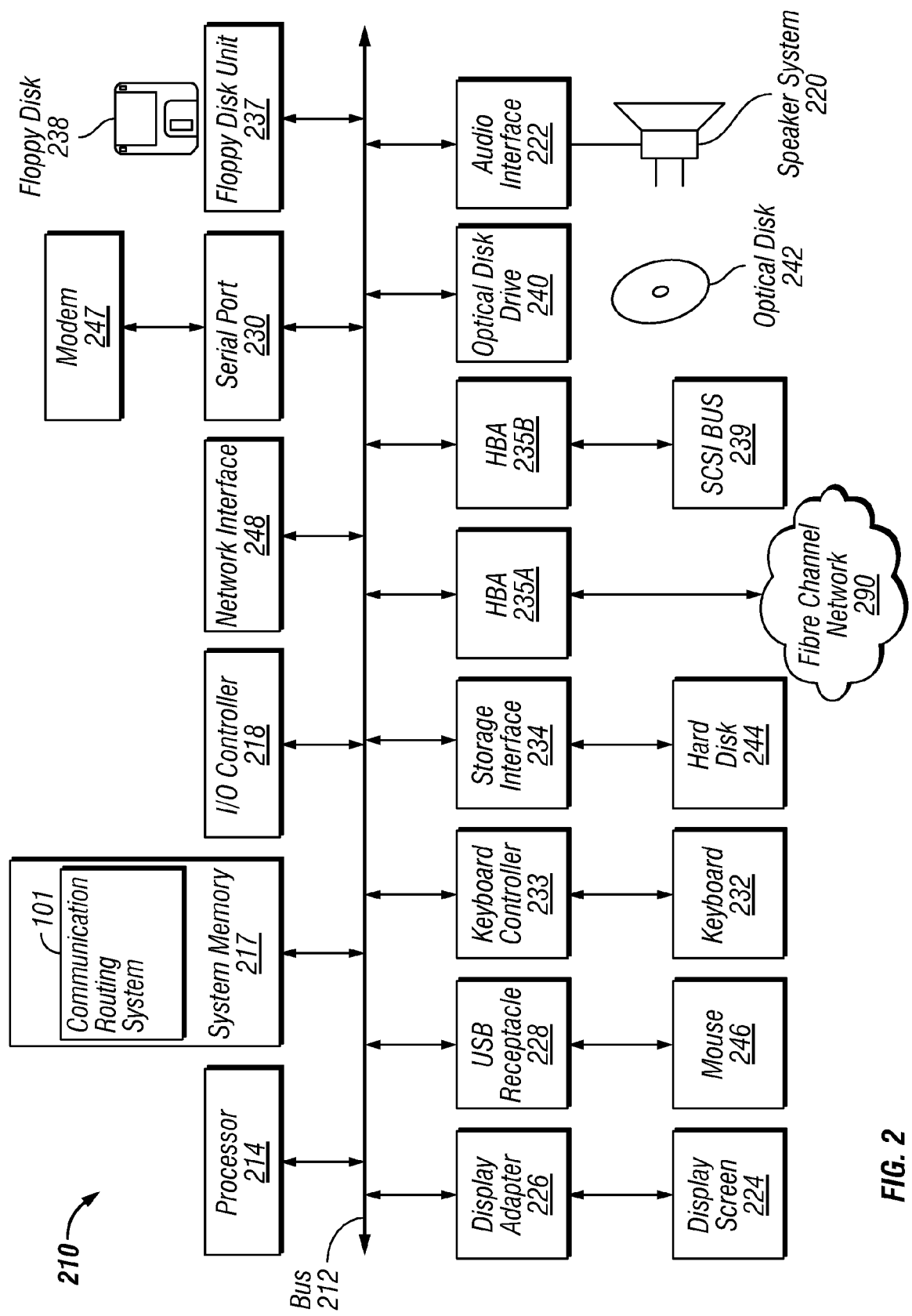
FIG. 2 is a block diagram of a computer system suitable for implementing a communication routing system, according to some embodiments.

FIG. 2 is a block diagram of a computer system 210 suitable for implementing a communication routing system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the communication routing system 101 is illustrated as residing in system memory 217. The workings of the communication routing system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
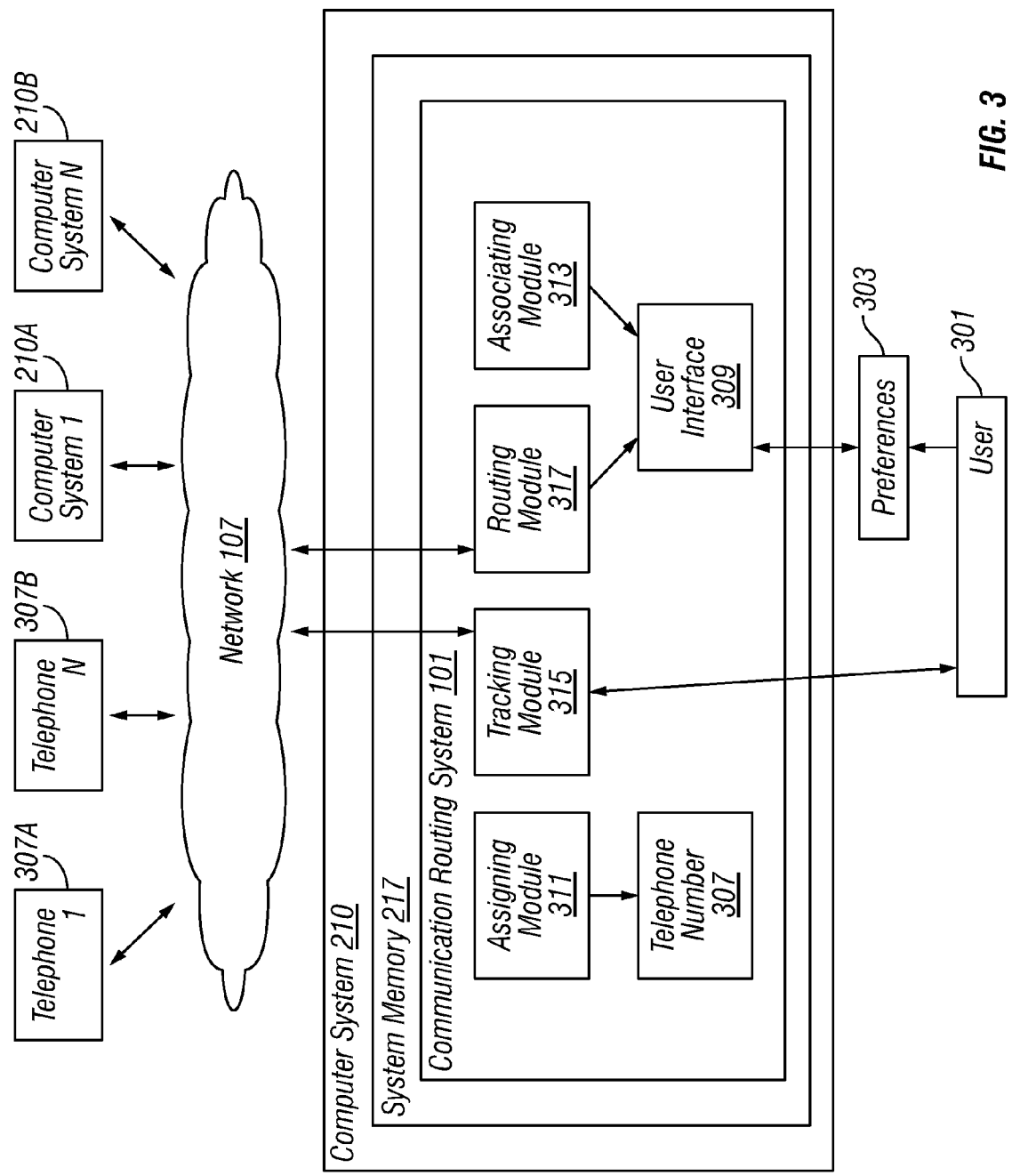
FIG. 3 is a block diagram of the operation of a communication routing system, according to some embodiments.

FIG. 3 illustrates the operation of a communication routing system 101, residing in the system memory 217 of a computer system 210 according to some embodiments. As described above, the functionalities of the communication routing system 101 can reside on a client 103, a server 105, or be distributed between multiple computer systems 210, including within a cloud-based computing environment in which the functionality of the communication routing system 101 is provided as a service over a network 107. It is to be understood that although the communication routing system 101 is illustrated in FIG. 3 as a single entity, the illustrated communication routing system 101 represents a collection of functionalities, which can be instantiated as a single or multiple modules as desired (an instantiation of specific, multiple modules of the communication routing system 101 is illustrated in FIG. 3). It is to be understood that the modules of the communication routing system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the communication routing system 101 can be stored on computer readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a communication routing system 101 allows a user 301 to enter routing preferences 303 for the processing of both voice calls and electronic text-based messaging (e.g., SMS, IM, email, etc.). An assigning module 311 of the communication routing system 101 can assign a single telephone number 302 to the user 301 for communication routing system 101 based telephony. It is this communication routing system telephone number 302 from which outgoing calls will originate and to which incoming calls will be made. In some embodiments, this communication routing system telephone number 302 is also used for at least certain types of electronic messages, such as SMS messages. In some embodiments, the assigning module 311 of the communication routing system 101 assigns a separate messaging handle to the user 301 for at least certain types of electronic messages, such as IM and/or email messages.

An associating module 313 of the communication routing system 101 associates a plurality of communication devices with the user 301. These communication devices can comprise telephones 307 of any type (mobile phones, smart phones, standard home and office phones, etc.). In some embodiments, communication devices can also comprise computer systems 210 such as desktop computers or mobile computing devices. Communication devices can be associated with the user 301 by, for example, the user 301 operating a user interface 309 of the communication routing system 101, and registering the communication devices s/he wishes to use.

A tracking module 315 of the communication routing system 101 tracks the physical location of each registered communication device. For devices with mostly static locations (e.g., landlines, desktop computers), the user 301 can enter the corresponding physical locations at registration time. For example, when registering landline phones 307 (e.g., home phones, work phones, etc.) with the communication routing system 101, the user can specify their physical locations as part of the registration process. For mobile devices with GPS or other location tracking functionality, the tracking module 315 of the communication routing system 101 can track their current locations in real time. The user 301 can update his/her registration of communication devices, for example registering a new device, deleting an old registered device, or updating the physical location of a device that has been moved.

The user 301 can enter routing preferences 303 for the processing of both outgoing and incoming voice calls and/or electronic text-based messaging, taking into account both the current physical location of the user 301 and the physical locations of the plurality of registered phones 307 and/or computing devices 210. A routing module 317 of the communication routing system 101 processes outgoing and incoming phone calls and/or electronic text-based messages according to the routing preferences 303. For example, a routing preference could direct the routing module 317 of the communication routing system 101 to ring a registered landline 307 when the user 301 receives a call on his/her communication routing system telephone number 302, if the user 301 is currently within a given proximity (e.g., ten feet, 100 feet, 300 feet, etc.) to that registered landline 307. If the call is not answered on that registered landline 307, the preference can direct the routing module 317 of the communication routing system 101 to, e.g., ring other phones 307, ring the user's mobile phone 307, etc.

The routing preferences taking into account the user's location as well as the location of registered communication devices can also direct the routing module 317 of the communication routing system 101 as to which telephone 307 to use when the user 301 initiates a call. More specifically, the user 301 indicates to the communication routing system 101 that s/he wants to make an outgoing call by, e.g., operating the user interface 309 of the communication routing system 101 or calling a phone number associated with the communication routing system 101. The routing module 317 of the communication routing system 101 uses the preferences 303 to determine from which registered phone 307 to make the call based on the user's current location and the locations of the communication devices. The routing module 317 of the communication routing system 101 calls the user on that phone 307, and connects him/her to the phone number the user wishes to call. For example, the preferences can state to always make outgoing calls from the user's mobile phone 307 if the user 301 and his/her mobile phone 307 are at the same physical location (within a specified parameter of difference, such as one foot, one meter, three meters, etc.). In another example, the preferences could indicate to make outgoing calls from the registered landline 307 physically closest to the user 301, unless the user 301 is beyond a specified distance from any registered landline 307, in which case to use the user's registered office phone 307.

It is to be understood that the specific, above-described routing preferences taking into account the user's current location as well as the locations of registered communication devices are examples only. Routing preferences for both incoming calls to and outgoing calls from the user's communication routing system telephone number 302 taking into the account the user's current location as well as the locations of registered communication devices can be specified at any level of detail. In one embodiment, the user 301 can enter, edit and/or delete such routing preferences, for example via the operation of the user interface 309 of the communication routing system 101. In some embodiments, at least some default preferences can be provided by the communication routing system 101.

In one embodiment, the tracking module 315 of the communication routing system 101 tracks the current physical location of the user 301 in real time by utilizing GPS or other another location tracking technology installed on the user's mobile phone 307 (or other portable computing device, such as a personal digital assistant, netbook computer, notebook computer, tablet computer, etc.). It is common today for mobile phones 307 and other portable computing devices to include GPS technology. A specific mobile phone 307 or other portable computing device can be registered with the communication routing system 101 as the device to use to track the user's current physical location. The user 301 subsequently carries the registered device, and the tracking module 315 of the communication routing system 101 uses the onboard location tracking technology to keep track of the current physical location of the user as the user moves about. In other embodiments, other methodologies can be used to track the user's location, such as a radio frequency identification tracking device, an infra-red beacon tracking device, a badge reader, a biometric scanning device, etc.

In addition, because the user can register not only telephony devices but also computing devices 210 such as desktop computers and laptop computers, the user can also enter preferences concerning the receipt and transmission of electronic text-based messages, according to the user's physical location in relation to the physical location(s) of registered device(s), and in some cases according to the current usage state of various messaging applications on registered devices. Such preferences could, for example, direct the routing module 317 of the communication routing system 101 to route incoming text messages to the user's desktop computer 210 in IM format if the user is within 100 feet thereof, otherwise to route incoming text messages to the user's mobile phone 307 as SMS messages. As another example, a preference could indicate that 1) if the user 301 is within a given distance to his/her desktop computer 210 and logged in to an IM application, incoming text messages are to be routed thereto as IM messages; 2) if the user 301 is within the given distance to his/her desktop computer 210 and not logged in to the IM application, incoming text messages are to be routed to the computer as email messages; and 3) if the user is not within the given distance to his/her desktop computer 210, incoming text messages are to be routed to the user's mobile phone 307 as SMS messages. It is to be understood that these are simply examples of the types of preferences that can be used in this context.

Figure 4:
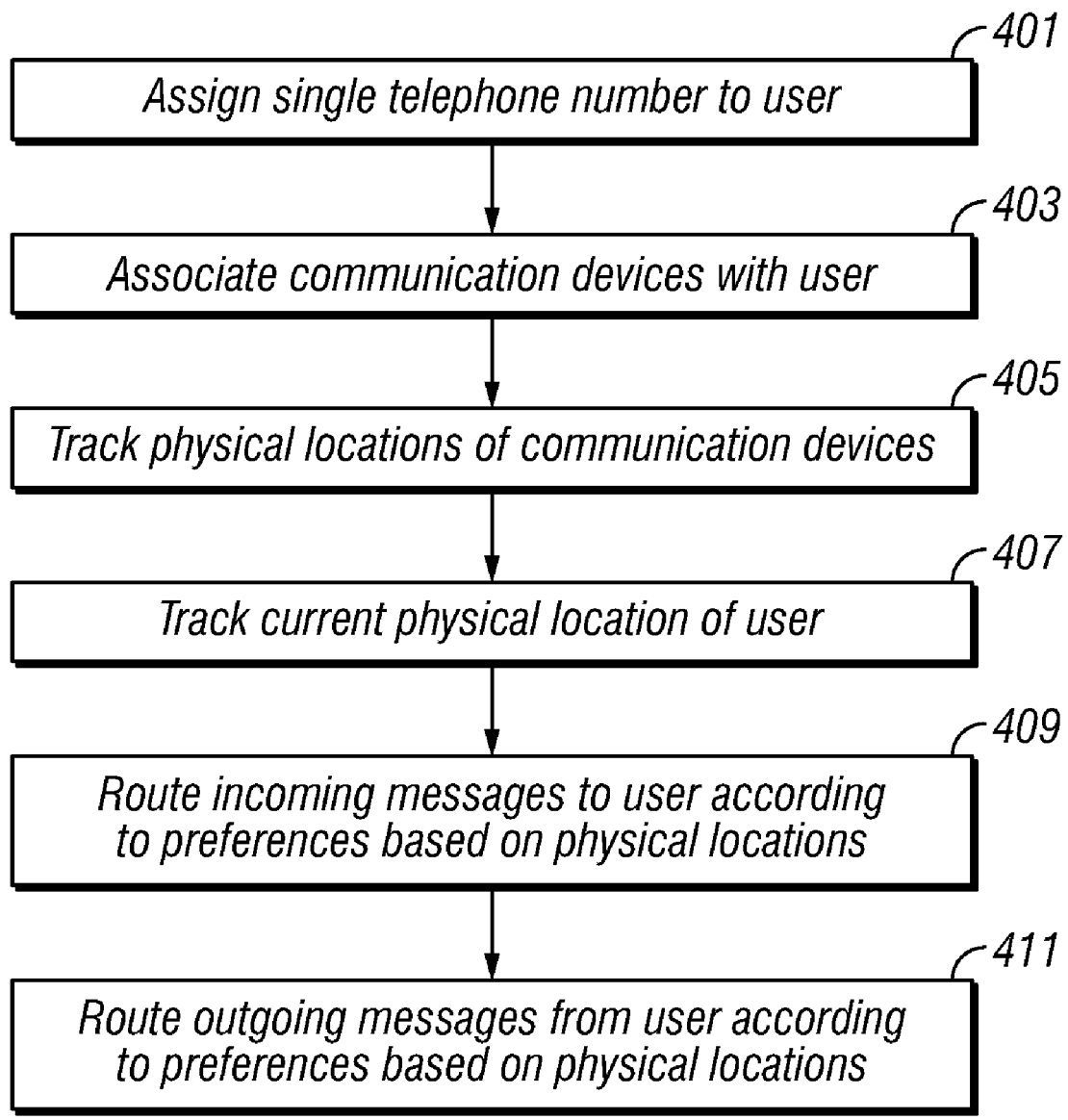
FIG. 4 is a flowchart of the operation of a communication routing system, according to some embodiments.

FIG. 4 is a flowchart illustrating steps for the operation of the communication routing system 101 (FIG. 1), according to some embodiments. The assigning module 311 (FIG. 3) of the communication routing system 101 (FIG. 1) assigns 401 a single telephone number 302 (FIG. 3) to the user 301 (FIG. 3). The associating module 313 (FIG. 3) of the communication routing system 101 (FIG. 1) associates 403 a plurality of communication devices with the user 301 (FIG. 3). The tracking module 315 (FIG. 3) of the communication routing system 101 (FIG. 1) tracks 405 the physical locations of the plurality of communication devices. The tracking module 315 (FIG. 3) also tracks 407 the current physical location of the user 301 (FIG. 3) in real time. The routing module 317 (FIG. 3) of the communication routing system 101 (FIG. 1) routes 409 incoming communication messages to the user 301 (FIG. 3) to at least one communication device of the plurality, according to routing preferences based on at least the current physical location of the user 301 (FIG. 3) and physical locations of communication devices. The routing module 317 (FIG. 3) of the communication routing system 101 (FIG. 1) also routes 411 outgoing communication messages from the user 301 (FIG. 3) from at least one communication device of the plurality, according to routing preferences based on at least the user's current physical location and physical locations of communication devices.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for routing communication messages according to a user's current physical location and physical locations of communication devices, the method comprising the steps of:

associating a plurality of communication devices with a user, by a computer;

tracking physical locations of the plurality of communication devices, by a computer;

tracking a current physical location of the user in real-time, by a computer;

routing incoming communication messages to the user to at least one communication device of the plurality, according to routing preferences based on at least the current physical location of the user and physical locations of at least one of the communication devices, by a computer, wherein routing incoming communication messages to the user further comprises routing incoming telephone calls made to a single telephone number associated with the user to at least one telephone associated with the user, according to routing preferences for incoming telephone calls based on at least the current physical location of the user and physical locations of multiple telephones associated with the user, by a computer; and routing outgoing communication messages from the user from at least one communication device of the plurality, according to routing preferences based on at least the user's current physical location and physical locations of at least one of the communication devices, by a computer.

2. The method of claim 1 wherein associating the plurality of communication devices with the user, by a computer, further comprises:
receiving, from the user, directives to register communication devices for location based routing, by a computer; and
associating the plurality of communication devices with the user responsive to the directive, by a computer.

3. The method of claim 1 wherein:
at least one communication device of the plurality comprises a telephone.

4. The method of claim 1 wherein:
at least one communication device of the plurality comprises a computer.

5. The method of claim 1 wherein tracking physical locations of the plurality of communication devices, by a computer, further comprises:
receiving, from the user, a physical location of at least one communication device, by a computer.

6. The method of claim 1 wherein tracking physical locations of the plurality of communication devices, by a computer, further comprises:
using location tracking functionality of at least one communication device to track the physical location of the at least one communication device, by a computer.

7. The method of claim 1 wherein tracking the current physical location of the user in real-time, by a computer, further comprises:
associating a specific, mobile communication device with the user, by a computer; and
using location tracking functionality of the specific, mobile communication device associated with the user to track the physical location of the user, by a computer.

8. The method of claim 1 further comprising:
receiving routing preferences from the user, by a computer.

9. The method of claim 1 wherein routing incoming communication messages to the user to at least one communication device of the plurality, according to routing preferences based on at least the current physical location of the user and physical locations of at least one of the communication devices, by a computer, further comprises:
routing incoming electronic text-based messages sent to a message handle associated with the user to at least one communication device associated with the user in a specific format, according to routing preferences for incoming electronic text-based messages based on at least the current physical location of the user, physical locations of multiple communication devices, and a current usage state of a messaging application by the user, by a computer.

10. The method of claim 1 wherein routing outgoing communication messages from the user from at least one communication device of the plurality, according to routing preferences based on at least the user's current physical location and physical locations of at least one of the communication devices, by a computer, further comprises:
originating outgoing telephone calls from a single telephone number associated with the user from a specific telephone associated with the user, according to routing preferences for outgoing telephone calls based on at least the current physical location of the user and the physical location of at least one telephone associated with the user, by a computer.

11. The method of claim 1 wherein routing outgoing communication messages from the user from at least one communication device of the plurality, according to routing preferences based on at least the user's current physical location and physical locations of at least one of the communication devices, by a computer, further comprises:
sending outgoing electronic text-based messages from a message handle associated with the user from a specific communication device associated with the user in a specific format, according to routing preferences for outgoing electronic text-based messages based on at least the current physical location of the user, the physical location of at least one communication device associated with the user, and a current usage state of a messaging application by the user, by a computer.

12. At least one non-transitory computer readable storage medium storing a computer program product for routing communication messages according to a user's current physical location and physical locations of communication devices, the computer program product comprising:
program code for associating a plurality of communication devices with a user;
program code for tracking physical locations of the plurality of communication devices;
program code for tracking a current physical location of the user in real-time;
program code for routing incoming communication messages to the user to at least one communication device of the plurality, according to routing preferences based on at least the current physical location of the user and physical locations of at least one of the communication devices, wherein routing incoming messages to the user further comprises routing incoming telephone calls made to a single telephone number associated with the user to at least one telephone associated with the user, according to routing preferences for incoming telephone calls based on at least the current physical location of the user and physical locations of multiple telephones associated with the user; and
program code for routing outgoing communication messages from the user from at least one communication device of the plurality, according to routing preferences based on at least the user's current physical location and physical locations of at least one of the communication devices.

13. The computer program product of claim 12 wherein the program code for tracking physical locations of the plurality of communication devices further comprises:
program code for using location tracking functionality of at least one communication device to track the physical location of the at least one communication device.

14. The computer program product of claim 12 wherein the program code for tracking the current physical location of the user in real-time further comprises:
program code for associating a specific, mobile communication device with the user; and
program code for using location tracking functionality of the specific, mobile communication device associated with the user to track the physical location of the user.

15. The computer program product of claim 12 wherein the program code for routing incoming communication messages to the user to at least one communication device of the plurality, according to routing preferences based on at least the current physical location of the user and physical locations of at least one of the communication devices further comprises:

program code for routing incoming telephone calls made to a single telephone number associated with the user to at least one telephone associated with the user, according to routing preferences for incoming telephone calls based on at least the current physical location of the user and physical locations of multiple telephones associated with the user.

16. The computer program product of claim 12 wherein the program code for routing incoming communication messages to the user to at least one communication device of the plurality, according to routing preferences based on at least the current physical location of the user and physical locations of at least one of the communication devices further comprises:

program code for routing incoming electronic text-based messages sent to a message handle associated with the user to at least one communication device associated with the user in a specific format, according to routing preferences for incoming electronic text-based messages based on at least the current physical location of the user, physical locations of multiple communication devices, and a current usage state of a messaging application by the user.

17. The computer program product of claim 12 wherein the program code for routing outgoing communication messages from the user from at least one communication device of the plurality, according to routing preferences based on at least the user's current physical location and physical locations of at least one of the communication devices further comprises:

program code for originating outgoing telephone calls from a single telephone number associated with the user from a specific telephone associated with the user, according to routing preferences for outgoing telephone calls based on at least the current physical location of the user and the physical location of at least one telephone associated with the user.

18. The computer program product of claim 12 wherein the program code for routing outgoing communication messages from the user from at least one communication device of the plurality, according to routing preferences based on at least the user's current physical location and physical locations of at least one of the communication devices further comprises:

program code for sending outgoing electronic text-based messages from a message handle associated with the user from a specific communication device associated with the user in a specific format, according to routing preferences for outgoing electronic text-based messages based on at least the current physical location of the user, the physical location of at least one communication device associated with the user, and a current usage state of a messaging application by the user.

19. A computer implemented method for routing communication messages according to a user's current physical location and physical locations of communication devices, the method comprising the steps of:

associating a plurality of communication devices with a user, by a computer;

tracking physical locations of the plurality of communication devices, by a computer;

tracking a current physical location of the user in real-time, by a computer;

routing incoming communication messages to the user to at least one communication device of the plurality, according to routing preferences based on at least the current physical location of the user and physical locations of at least one of the communication devices, by a computer; and routing outgoing communication messages from the user from at least one communication device of the plurality, according to routing preferences based on at least the user's current physical location and physical locations of at least one of the communication devices, by a computer, wherein routing outgoing communication messages from the user further comprises originating outgoing telephone calls from a single telephone number associated with the user from a specific telephone associated with the user, according to routing preferences for outgoing telephone calls based on at least the current physical location of the user and the physical location of at least one telephone associated with the user.

* * * * *